E. A. FORD.
ENGINE DRIVE.
APPLICATION FILED MAR. 14, 1921.
1,398,260.
Patented Nov. 29, 1921.
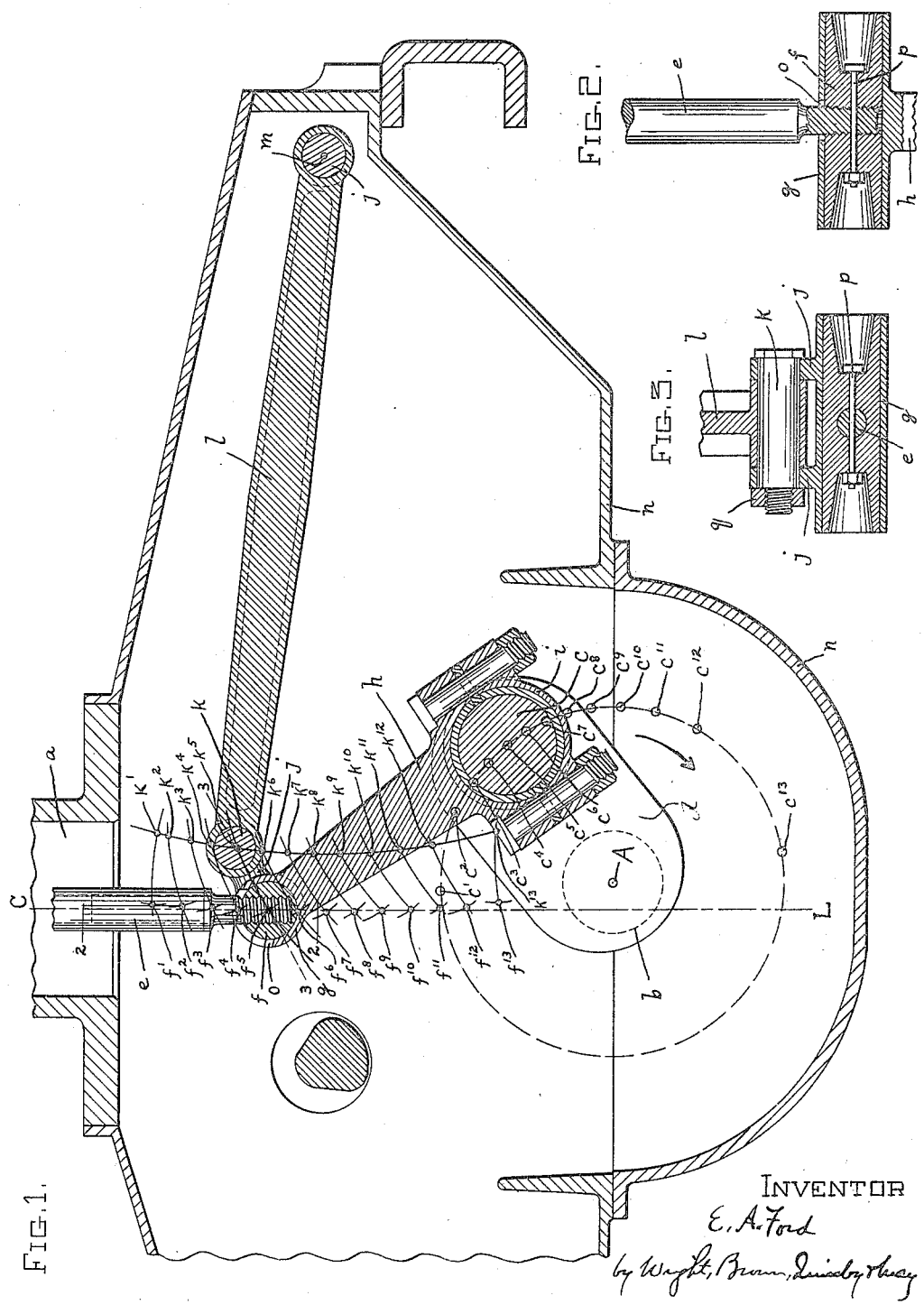
INVENTOR
E. A. Ford
by Wright, Brown, Quinby & Mey
ATTORNEYS

UNITED STATES PATENT OFFICE.

EUGENE A. FORD, OF NEWTON, MASSACHUSETTS, ASSIGNOR TO R. E. D. ENGINE COMPANY, INC., OF NEW YORK, N. Y., A CORPORATION OF NEW YORK.

ENGINE-DRIVE.

1,398,260.     Specification of Letters Patent.     Patented Nov. 29, 1921.

Application filed March 14, 1921. Serial No. 452,362.

*To all whom it may concern:*

Be it known that I, EUGENE A. FORD, a citizen of the United States, residing at Newton, in the county of Middlesex and State of Massachusetts, have invented new and useful Improvements in Engine-Drives, of which the following is a specification.

The present invention relates to engines of the reciprocating type, and conversely is applicable to pumps of similar type. It will be described in the following specification in terms of its application to an internal combustion engine, but the scope in which I claim protection is not limited to that particular use.

The object of the invention is to provide in a reciprocating engine, and its converse a pump, a means for relieving the piston and cylinder wall of side thrust and at the same time reducing the friction of the reciprocating parts, to lighten the weight of the reciprocating parts, to secure quick reversal of the piston at the head end of its stroke, and secure improved balance in the case of an engine having a multiplicity of cylinders.

The nature of the invention is fully explained in the following description of a specific embodiment thereof and by the drawings forming a part of this specification.

In the drawings,—

Figure 1 is a section of so much of a reciprocating engine of the internal combustion type as is necessary to explain the principles of the invention.

Figs. 2 and 3 are sectional detail views taken on the lines 2—2 and 3—3, respectively, of Fig. 1.

In Fig. 1, $a$ represents one of the cylinders of an internal combustion engine, and typifies any engine cylinder in which a piston is arranged to reciprocate. $b$ represents the crank shaft, $c$ represents the crank-pin which is carried by webs or arms $d$. $e$ is a piston rod which is connected with the reciprocating piston by a knuckle or hinge joint and is made fast to a wrist-pin $f$. Said wrist-pin is contained in a bearing $g$ in one end of a connecting rod $h$, the other end of which is provided with a box $i$ embracing the crank $c$.

The connecting rod $h$ has a lateral arm $j$ which is connected by a pivot pin $k$ with a link $l$ having its opposite end anchored by a pivot pin $m$ in the frame.

$n$ represents a crank case or equivalent structure housing the parts above described and supporting the cylinder, the pivot $m$ and the bearings for the crank-shaft.

The details of the manner in which I prefer to construct the connecting rod and its connections with the piston rod and the guiding link are shown in Figs. 2 and 3. The wrist-pin $f$ and bearing sleeve $g$ are long in order to distribute the pressure of one against the other. The piston rod passes through a slot $o$ in the bearing sleeve and is threaded into the wrist-pin, being anchored therein by a locking pin $p$. The slot $o$ has an angular length slightly greater than the angle through which the connecting rod swings about the wrist-pin.

The arm $j$ which projects laterally from the wrist-end of the connecting rod is preferably composed of two arms or webs, as shown in Fig. 3, receiving the end of the guiding link between them and having holes alined with a cross passage through the end of the link in which the pivot pin $k$ is seated, the latter having a head on one end and a nut $q$ on the other end.

The combined action of the guide link $l$ and the lateral arm $j$ of the connecting rod has an important effect in guiding the wrist-pin in a path very close to the axial line of the cylinder; a path which is nearer to a straight line than is the arc in which the pivot pin $k$ swings. The axis of the crank-shaft is set over to one side of the center line of the cylinder toward the pivot of the guide link, and this arrangement contributes to the effect just described. This fact is clearly apparent from Fig. 1, where C—L represents the center line of the cylinder and A the axis of the crank-shaft.

The character of the relative motion of the piston, wrist-pin, crank-pin and guide link pivot $k$ is diagrammatically analyzed in Fig. 1. In this diagram the points designated by the letter $f$ with exponents running consecutively from 1 to 13 are the positions of the wrist-pin center with equal stages of the piston travel from one end of its stroke to the other. The points designated by the letter $k$, with similar exponents, indicate corresponding positions of the pivot which attaches the connecting rod arm to the guide link, and the points indicated by the letter $c$, with similar exponents, designate corresponding positions of the crank-pin. The close approximation of the path of the wrist-pin to a straight line is shown by the position of the points $f^1$, $f^2$, etc., with relation to the center line C—L, and it is apparent that there is less displacement of any of these points from such line than the displacement of the points $k^1$, $k^2$, etc., from a straight line midway between and parallel to the chord of arc $k^1$, $k^{13}$, and the tangent to the central point of said arc. The comparatively close spacing of the points $c^1$, $c^2$, $c^3$, as compared with the spacing of the points, $c^{11}$, $c^{12}$, $c^{13}$, shows that the reversal of the piston travel at the head end of its stroke occurs, and that its speed in the working stroke becomes approximately equal to that of the crank-pin, during a relatively short proportional part of the rotation of the shaft; while a comparatively long dwell of the piston occurs when the crank-pin crosses the dead center at the end of the working stroke.

As compared with the ordinary type of internal combustion engine, in which the connecting rod joins the piston and crank-pin directly, there is a quicker reversal of the piston at the end of the compression stroke and beginning of the working stroke, a quicker acceleration of the piston speed, and a longer dwell between the end of the working stroke and beginning of the exhaust stroke. These actions result in greater thermal efficiency and give greater opportunity for scavenging the cylinder of exhaust gases. The improved scavenging effect is particularly marked when the invention is applied to a two cycle engine.

A great gain in mechanical efficiency results from the close approximation of the wrist-pin travel to the center line, because thereby substantially all side thrust of the piston on the cylinder is eliminated, and the gain derived from this elimination is not offset to any considerable extent by the friction of the pivots $m$ and $k$. Indeed, the loss of power absorbed in the friction of these parts is much less than that of a sliding cross-head, and the guide link is lighter in weight and simpler than a cross-head and its guides. Inasmuch as the stresses applied to the guide link are almost wholly tensile stresses and there is substantially no compression stress applied to it at any time, the link may be made light in weight and at the same time have sufficient stiffness. The connecting rod, being short, is comparatively light in weight, and the mode of connecting it with the link by a pivot pin at one side of the wrist-pin relieves the wrist-pin of stresses and wear except those due to the thrust of the piston.

It will be appreciated from the foregoing explanation that the invention has resulted in the provision of an engine having greater thermal and mechanical efficiency, lighter reciprocating parts, and less vibration than engines of the sort heretofore used.

What I claim and desire to secure by Letters Patent is:

1. An engine comprising a cylinder, piston, piston rod, crank, connecting rod and guide link, the connecting rod having a lateral arm beside the wrist-connection and said lateral arm being pivoted to the guide link.

2. In an engine, a cylinder, a crank, a piston reciprocating in the cylinder, a piston rod projecting from said piston, a connecting rod between the crank and piston rod and having a wrist-connection with the latter, an arm projecting laterally from the wrist-end of the connecting rod, and a guide link pivoted on a fixed axis having a pivotal connection with said connecting rod arm.

3. In an engine, a cylinder, a crank-shaft, piston rod, connecting rod and guide link, said guide link being mounted on a fixed pivot at one side of the center line of the cylinder and the connecting rod having a laterally projecting arm beside the wrist connection which is pivoted to said link, and the crank being set at one side of the cylinder center line toward the pivot of the link.

4. In an engine having a cylinder, a reciprocating piston, a revolving crank, a piston rod projecting from the piston, and a connecting rod between said crank and piston rod and having a wrist connection with the latter, a means for guiding said wrist connection in a path in close approximation to the center line of the cylinder, comprising a lateral arm projecting from the connecting rod beside the wrist connection, and a guide link pivoted to said lateral arm and having a fixed pivot support.

5. In an engine having a cylinder, piston and piston rod and crank, a connecting rod having bearing boxes at its ends, one of which boxes is adapted to receive a wrist pin attached to the connecting rod, separate arms projecting laterally from the connecting rod adjacent to said last-named bearing box, a link having an eye at one end contained between said arms, a pivot pin passing through said arms and interposed eye, and a fixed pivot engaged with said link at a point remote from said pivot pin.

6. An engine comprising a cylinder, a piston, a crank, a connecting rod, a piston rod jointed to the connecting rod by a wrist joint, a pivoted guide link, and a connection between the guide link and connecting rod arranged to compensate for the arc in which said link swings during the working stroke and to cause travel of the wrist joint in a path having a closer approximation than said arc to a straight line.

7. An engine comprising a cylinder, a piston, a crank, a connecting rod, a piston rod jointed to the connecting rod by a wrist joint, a guide link pivotally supported at a point at one side of the approximate mid-stroke position of the wrist joint, and a pivot joint between the connecting rod and said link at the same side of the path in which the wrist joint travels, and at such a distance from said path as to make that path a closer approximation to a straight line than is the arc in which said pivot joint swings.

In testimony whereof I have affixed my signature.

EUGENE A. FORD.